(12) United States Patent
Yamamoto

(10) Patent No.: US 6,673,474 B2
(45) Date of Patent: Jan. 6, 2004

(54) MEDIUM SUBSTRATE, PRODUCTION METHOD THEREOF AND MAGNETIC DISK DEVICE

(75) Inventor: Kenrou Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 09/818,764

(22) Filed: Mar. 27, 2001

(65) Prior Publication Data

US 2002/0037437 A1 Mar. 28, 2002

(30) Foreign Application Priority Data

Aug. 9, 2000 (JP) ........................................ 2000-241545

(51) Int. Cl.$^7$ ................................................ G11B 5/66
(52) U.S. Cl. ................ 428/694 ST; 428/694 SG; 428/900; 427/128; 427/129; 427/130; 427/131; 65/30.1; 65/30.14; 65/31; 65/60.1; 65/60.5
(58) Field of Search ................ 428/694 ST, 694 SG, 428/900; 427/128–130, 131; 65/30.1, 30.14, 31, 60.1, 60.5

(56) References Cited

U.S. PATENT DOCUMENTS

| 5,053,250 | A | | 10/1991 | Baseman et al. ............ 427/131 |
|---|---|---|---|---|
| 5,080,948 | A | * | 1/1992 | Morita ........................ 428/64.1 |
| 5,108,781 | A | | 4/1992 | Ranjan et al. .............. 427/53.1 |
| 5,744,208 | A | * | 4/1998 | Beall ........................... 428/64.1 |
| 5,972,816 | A | * | 10/1999 | Goto ............................... 501/4 |
| 6,134,918 | A | * | 10/2000 | Eto ............................ 65/30.16 |
| 6,312,841 | B1 | * | 11/2001 | Watanabe ............... 428/694 T |

* cited by examiner

Primary Examiner—Leszek Kiliman
(74) Attorney, Agent, or Firm—Greer, Burns & Crain, Ltd.

(57) ABSTRACT

A medium substrate comprising a borosilicate glass containing silica as a main component and having on the surface thereof a continuous texture derived from the porous structure, the medium substrate being used as a substrate in the production of a magnetic recording medium and other. The method for the production of the textured medium substrate is also disclosed, along with a magnetic recording medium using the medium substrate and a magnetic disk device.

23 Claims, 4 Drawing Sheets

MEDIUM SUBSTRATE, PRODUCTION METHOD THEREOF AND MAGNETIC DISK DEVICE

BACKGROUND OF THE INVENTION

1. Field of the Invention

The present invention relates to medium formation technologies and, more particularly, the present invention relates to a medium substrate, having a textured surface, which can be used as a substrate or support in magnetic recording mediums and the like, and a production method therefor. The present invention also relates to a magnetic recording medium using the medium substrate, a production method therefor, and a magnetic disk device having installed therein the magnetic recording medium.

2. Description of the Related Art

As is well known, various disk devices are used as external memory units of computers. A magnetic disk device records or reproduces the data with a magnetic head flying close to a disk. For this method of recording and reproducing data, a so-called CSS (contact start stop) system is generally employed, where the magnetic head contacts the disk surface when the disk is stationary, and the magnetic head slides on the disk while contacting therewith when the disk is actuated or stopped.

On the magnetic disk used in the CSS system, appropriately finely roughened surface asperities called "texture" are formed so as to prevent stiction (a phenomenon of the head being adsorbed to the disk surface; this may cause failure of the disk to rotate or deformation or breaking of the head supporting system) or reduce the friction against the head.

The texture formation (namely, texturing) on the magnetic disk is performed using various methods. In general, a mechanical system using an abrasive tape or an abrasive slurry is employed. For example, in the case of forming a texture on the surface of an Ni—P substrate, scratches are formed over the area in the circumferential direction on the substrate surface using a coarse abrasive tape and then the surface is lapped using a fine tape. In this method, however, the abrasive grains are fixed to the tape, burs are generated and this causes a problem. The lapping to remove these burs is liable to cause excess lapping or overlapping.

In order to cope with the demand for higher recording density, a glass substrate, a ceramic substrate, or the like, are frequently used in place of an Ni-P substrate. However, these substrates are generally brittle and have a high hardness, therefore, when texture is imparted by the above-described mechanical system, the substrate may be disadvantageously damaged or broken. Furthermore, this system cannot ensure precise control of the asperity form, therefore, it is very difficult to satisfy both the CSS properties and the low flying height requirement of the magnetic head at the same time.

For example, U.S. Pat. No. 5,108,781 describes a technique of preparing and polishing a Ni-plated aluminum substrate and imparting texture to the polished substrate surface by laser heating. According to this method, the protective film of the magnetic disk obtained replicates the texture of substrate, therefore, stiction occurring when the head (slider) is stopped on the protective film can be reduced. However, in this method, polishing and laser texturing of the substrate are essential matters, therefore, not only the production process of disk is complicated but also the production cost increases.

On the other hand, U.S. Pat. No. 5,053,250 describes a method of forming an underlayer having asperities in situ on a disk substrate. According to this method, a low melting point metal (for example, gallium) is adhered to a heated substrate by sputtering and an underlayer comprising disconnected liquid balls of a low melting point metal (a structure having a stripe pattern of asperities) is formed thereon. After the liquid balls are solidified, a magnetic recording film and a protective film are formed in this order on the underlayer having asperities, then, the asperities on the underlayer surface are replicated and a textured surface is accomplished on the head/disk interface of disk. However, in this method, unless the conditions in texturing such as formation of underlayer are controlled with great care, the crystal growth of the magnetic recording film obtained may be adversely affected. In addition, in this method, the size and cycle of surface asperities are small or the recess depth has an excessively uniform distribution, therefore, the coefficient of friction is not reduced as expected and the CSS properties are not necessarily satisfied.

SUMMARY OF THE INVENTION

The object of the present invention is to solve the above-described various problems in conventional texturing techniques.

Accordingly, one object of the present invention is to provide a medium substrate, with a texture, which can be suitably used in the production of a magnetic recording medium or the like capable of high-density recording, can be produced easily, stably and at a low cost, and can satisfy both the CSS properties and the low-floating requirements of a magnetic head.

Another object of the present invention is to provide a method for producing the medium substrate.

Further, another object of the present invention is to provide a magnetic recording medium using the medium substrate.

Furthermore, another object of the present invention is to provide a method for producing the magnetic recording medium using the medium substrate.

In addition, still another object of the present invention is to provide a magnetic disk device using the magnetic recording medium.

The above-described objects and other objects of the present invention will be easily understood from the following detailed description.

As a result of extensive investigation to attain the above-described objects, the present inventor has found that it is effective to select a borosilicate glass mainly comprising silica as the substrate material, heat-treat the glass to cause phase separation and subsequently treat it with an acid to form a texture of pores and also found that the density and size of the formed texture of pores can be easily controlled by controlling the heat-treatment temperature and heat-treatment time.

In one aspect thereof, the present invention resides in a medium substrate for use as a substrate in magnetic recording mediums and the like, comprising a borosilicate glass containing silica as a main component and having on the surface thereof a continuous texture derived from the porous structure.

In another aspect thereof, the present invention resides in a method for producing a medium substrate comprising a borosilicate glass containing silica as a main component and having on the surface thereof a continuous texture derived from the porous structure, the method comprising heat-treating a disk-like borosilicate glass to cause phase separation and treating the glass after the phase separation with an acid to dissolve out the phase separation components and thereby render the borosilicate glass porous.

Further, in another aspect thereof, the present invention resides in a magnetic recording medium comprising a substrate having applied thereon at least a magnetic recording layer, said substrate comprising a borosilicate glass containing silica as a main component and having on the surface thereof a continuous texture derived from the porous structure.

Furthermore, in another aspect thereof, the present invention resides in method for producing a magnetic recording medium comprising a substrate having applied thereon at least a magnetic recording layer, =p the method comprising heat-treating a borosilicate glass disk to cause phase separation and treating the phase separated glass with an acid to dissolve out the phase separation components, thereby producing a substrate comprising a borosilicate glass containing silica as a main component and having on the surface thereof a continuous texture derived from the porous structure produced upon said acid treatment.

In addition, in still another aspect thereof, the present invention resides in a magnetic disk device comprising a recording head part for recording information in a magnetic recording medium and a reproducing head part for reproducing the information, wherein the magnetic recording medium is a magnetic recording medium comprising a nonmagnetic substrate having provided thereon a magnetic recording layer and the substrate comprises a borosilicate glass containing silica as a main component and having on the surface thereof a continuous texture derived from the porous structure.

DESCRIPTION OF THE PREFERRED EMBODIMENTS

The medium substrate of the present invention can be used as a substrate for magnetic recording mediums (magnetic disk), other recording mediums or different mediums. A typical example of the use is a magnetic disk substrate, however, the substrate of the present invention can be advantageously used in any type of mediums which are required to have a texture on the surface. The present invention is described below particularly by referring to a magnetic disk.

Figure 1:
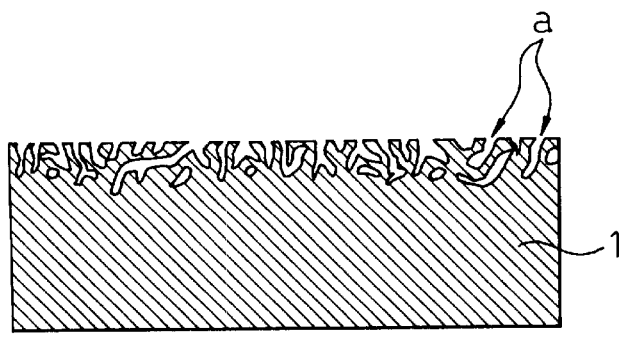
FIG. 1 is a cross-sectional view schematically showing the porous structure of the medium substrate of the present invention.

FIG. 1 is a cross-sectional view schematically showing the medium substrate according to the present invention. The substrate 1 comprises a borosilicate glass containing silica as a main component and on the surface thereof, a continuous texture derived from the porous structure (due to distribution of pores a) of the substrate is provided. As shown in the figure, the porous structure is usually formed only in the surface portion of the substrate 1. This selective formation of the porous structure, which is described in detail later, can be attained by heat-treating a borosilicate glass to cause phase separation and further acid-treating the glass according to the present invention.

The texture on the surface of the substrate 1 can have various shapes, for example, wave, serration, trapezoid or a combination thereof. The size (the size as used herein means a surface roughness stipulated by Technical Committee TC 57 of International Standardization organism, namely center-line average roughness Ra) of the texture can vary widely depending on the use end of the medium substrate, however, in the case of use as a magnetic disk substrate, the size is usually from about 1 to 10 nm. In the present invention, the substrate surface has a minute porous structure, therefore, even if the surface roughness Ra is as small as 1 nm, a sufficiently high operation effect can be obtained and stiction does not occur. If the surface roughness Ra exceeds 10 nm, the replicated projections are excessively large and the floating of the head cannot be ensured in some cases.

For the medium substrate of the present invention, various borosilicate glasses can be used but in particular, borosilicate glasses starting from $Na_2O$, $B_2O_3$ and $SiO_2$, namely, sodium borosilicate glasses, can be advantageously used. The sodium borosilicate glass preferably has the following compositions:

$Na_2O$ 10 to 30% by weight,
$B_2O_3$ 10 to 30% by weight, and
$SiO_2$ 50 to 80% by weight.

The sodium borosilicate glass more preferably consists of 10% by weight of $Na_2O$, 30% by weight of $B_2O_3$ and 60% by weight of $SiO_2$.

In the medium substrate of the present invention, in addition to the above-described sodium borosilicate glass, borosilicate glasses starting from $Li_2O$, $B_2O_3$ and $SiO_2$, namely, lithium borosilicate glasses, can be advantageously used. The lithium borosilicate glass preferably has the following composition:

$Li_2O$ 5 to 30% by weight,
$B_2O_3$ 10 to 30% by weight, and
$SiO_2$ 50 to 80% by weight.

The lithium borosilicate glass more preferably consists of 5% by weight of $Li_2O$, 30% by weight of $B_2O_3$ and 66% by weight of $SiO_2$.

Figure 2:
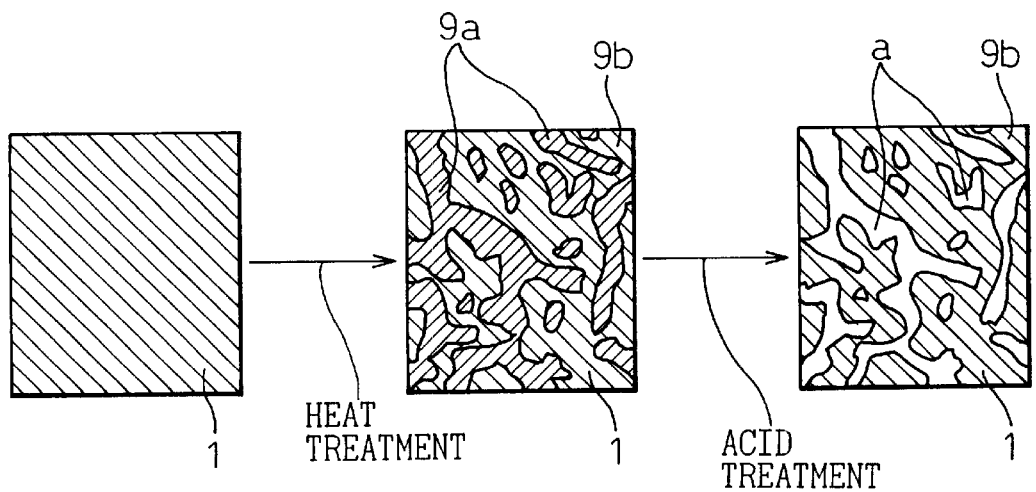
FIG. 2 is a cross-sectional view schematically showing the change in the substrate surface in the phase separation step and the subsequent step for rendering the substrate porous.

The porous structure of the medium substrate comprising a borosilicate glass of the present invention can be formed by the phase separation of a borosilicate glass by a heat treatment and elution of components by an acid treatment. These two continuous steps are described by referring to FIG. 2. Note that FIG. 2 shows an example of a sodium borosilicate glass formed starting from $Na_2O$, $B_2O_3$ and $SiO_2$ and sets forth sketches of a TEM (transmission-type electron microscopic photograph) of replicas of respective steps.

First, a block of sodium borosilicate glass is manufactured, sliced to a thickness suitable for a disk and subjected to coarse lapping and polishing. The step (a) schematically shows the state of the surface of the glass plate 1 after the polishing, where no change is observed.

Subsequently, the glass plate 1 is heat-treated at a temperature suitable for the phase separation. The heat-treatment temperature and time can be vary widely depending on the kind of borosilicate glass used, however, the heat treatment is usually performed at a temperature of about 500 to 700° C. for about 5 to 24 hours. After the passing of a predetermined time, phase separation of borosilicate glass takes place and as shown in Step (b), islands 9a of $Na_2O$—$B_2O_3$ are formed, like a worm-eaten state, in the sea 9b comprising $SiO_2$.

In forming the phase-separated glass as above, the textured state on the surface of the finally obtained glass which is rendered porous, can be freely controlled. In fact, even with the same heat-treatment temperature (for example, at 650° C.), as the heat-treatment time is prolonged, the phase separation state can be more distinctly generated. For example, although the phase separation does not proceed so much at the heat treatment for 3 hours, a clear phase separation comes out after the passing of 6 hours and the phase separated region expands even after the passing of 10 hours. As the heat-treatment time is further prolonged to 15 hours, 25 hours and so on, the region expands more.

After the phase-separated glass is formed as above, the glass plate 1 is acid-treated. For the acid treatment, a diluted aqueous solution of an acid such as nitric acid, sulfuric acid, hydrochloric acid and acetic acid can be advantageously used. Among these, nitric acid is more preferred. The acid treatment can be performed using various means but, usually, the acid treatment is preferably performed by dipping the glass plate in a bath containing a solution of the selected acid. The concentration of the acid in the acid solution may be vary widely but it is usually from about 2 to 10 vol %. In particular, the concentration is preferably about 5 vol %. On use, the acid solution is preferably heated to a temperature of about 50 to 100° C. so as to elevate the treatment effect. To speak specifically, for example, the glass plate is dipped in an aqueous nitric acid solution kept at about 70° C. for about 1 hour. As a result of the acid treatment, the $Na_2O$—$B_2O_3$ gradually dissolves out into the aqueous nitric acid solution and as shown in Step (c) and pores a, corresponding to the islands of $Na_2O$—$B_2O_3$, are formed. That is, a porous glass plate (medium substrate) 1 substantially comprising only $SiO_2$ is completed. The pore size of pores a is from about 5 to 250 nm. The surface roughness Ra of the medium substrate is, as described above, usually from about 1 to 10 nm. However, unless the operation effect of the present invention is adversely affected, the medium substrate of the present invention may have a surface roughness Ra in excess of 10 nm. This medium substrate comprises $SiO_2$ glass having a purity of 99% or more and therefore, has high water resistance and good weather resistance.

In the medium substrate of the present invention, the continuous texture formed in the surface portion as above may be formed over the entire surface of the substrate or may be partially formed. However, for producing a high-performance medium, the latter is preferred. In particular, a texture derived from the porous structure is preferably formed only in the landing zone on the substrate surface.

The formation of porous texture only in the landing zone on the substrate may be attained using various means but usually, the selective formation is preferably performed using a resist method which is commonly used in the production of semiconductor devices. For example, after a phase-separated glass is formed as above, the glass plate is acid-treated after masking the region exclusive of the landing zone with a photoresist having excellent resistance against acids. After the completion of acid treatment, the photoresist is dissolved and thereby removed, as a result, a substrate having a texture only in the landing zone can be obtained. With respect to the photoresist and the dissolving and removing agent, those commonly used in the field of production of semiconductor devices and the like can be used.

In still another aspect, the present invention resides in a magnetic recording medium using the medium substrate of the present invention as the support. The magnetic recording medium of the present invention is not particularly limited as long as the medium substrate of the present invention is used. Accordingly, as can be easily understood by one skilled in the art, various layer structures can be employed.

Figure 3:
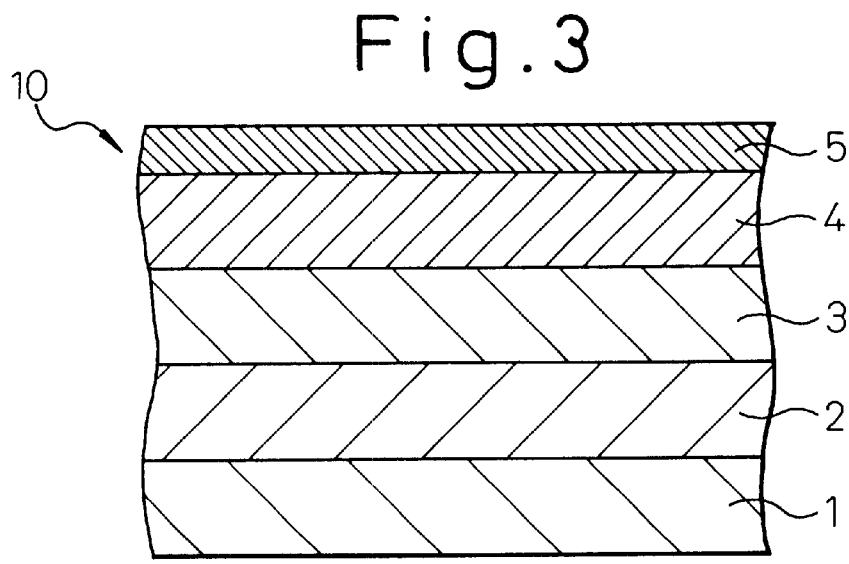
FIG. 3 is a cross-sectional view showing one example of the magnetic recording medium of the present invention.

The magnetic recording medium of the present invention is preferably a magnetic recording medium comprising a nonmagnetic substrate having thereon at least one magnetic recording layer comprising a magnetic metal material, characterized in that the substrate comprises a borosilicate glass containing silica as a main component and having on the surface thereof a continuous texture derived from the porous structure. The magnetic recording medium of the present invention is described below by referring to the fundamental structure shown in FIG. 3, however, the present invention is not limited by this description.

The magnetic recording medium 10 of the present invention comprises at least a nonmagnetic glass substrate 1, an underlayer 2, a magnetic recording layer (sometimes also referred to as "magnetic layer") 3, a carbon protective film 4 and a lubricant layer 5. However, various modifications can be made therein within the scope of the present invention. For example, the magnetic recording layer 3 may consist of multiple layers or an intermediate layer may be additionally provided. Actually, existing magnetic recording mediums have very complicated layer structures.

In the magnetic recording medium of the present invention, the nonmagnetic glass substrate corresponds to the medium substrate of the present invention and, as described above, comprises a borosilicate glass having a porous structure, preferably a sodium or lithium borosilicate glass. The porous structure of the borosilicate glass is formed by way of phase separation caused by a heat treatment of the glass and elution of components by an acid treatment subsequent to the heat treatment. In a preferred embodiment, the continuous texture on the glass substrate is selectively formed on the surface of the substrate comprising a borosilicate glass. With respect to this substrate and the production method therefor, those described above can be applied.

The underlayer on the nonmagnetic glass substrate can be formed of a general nonmagnetic metal material commonly used in magnetic recording mediums, preferably a nonmagnetic metal material mainly comprising chromium. The underlayer may be a single layer or may have a multi-layer structure comprising two or more layers. In the case of an underlayer having a multi-layer structure, the composition of each layer may be freely changed. In particular, the underlayer is advantageously constructed by a metal material mainly comprising only chromium or a metal material mainly comprising chromium and molybdenum. For example, in the case where the magnetic recording layer of the magnetic recording medium contains platinum, the underlayer is preferably constructed by a metal material mainly comprising chromium and molybdenum. This is because the interplanar spacing can be broadened by the addition of molybdenum and by approximating the interplanar spacing of the underlayer to the interplanar spacing of the magnetic recording layer, which is broadened by the composition thereof and, particularly, by the amount of platinum, the preferential orientation of the magnetic recording layer (CoCr-based system alloy) in the in-plane direction of the axis C can be accelerated. Suitable examples of the material for the underlayer include Cr, CrW, CrV, CrTi and CrMo.

The underlayer is preferably formed by a sputtering process such as magnetron sputtering, under general film-forming conditions. In order to elevate the coercivity, the sputtering is preferably performed under application of DC negative bias. For example, suitable film-forming conditions are such that the film-forming temperature is from about 100 to 300° C., the Ar gas pressure is from about 1 to 10 mTorr, and the DC negative bias is from about 100 to 300 V. If desired, another film-forming method, such as vapor deposition or ion beam sputtering, may be used in place of the sputtering. The thickness of the underlayer can be varied over a wide range according to various factors. In order to increase the S/N ratio, the thickness of the underlayer is generally from 5 to 60 nm, however, the thickness of the underlayer is not limited to this range. If the thickness of the underlayer is less than 5 nm, the magnetic properties may not be satisfactorily brought out, whereas if it exceeds 60 nm, the noise may increase.

In the magnetic recording medium of the present invention, an additional underlayer comprising a metal material containing titanium as a main component, preferably a Ti thin film, may be provided, if desired, between the glass substrate and the underlayer above the glass substrate. This intermediate layer has a function of improving the bonding strength between the glass substrate and the underlayer above the glass substrate.

In the magnetic recording medium of the present invention, the magnetic recording layer formed on the nonmagnetic underlayer can be formed, similarly to the underlayer, as a general magnetic recording layer commonly used in magnetic recording mediums. The magnetic recording layer can be formed of various magnetic metal materials commonly used in the field of magnetic recording medium. The magnetic recording layer is preferably formed of, for example, CoCrNi-based alloy or CoCrPt-based alloy, however, the present invention is not limited thereto.

The magnetic recording layer may be a single layer or may have a multi-layer structure comprising two or more layers. In the case of a magnetic recording layer having a multi-layer structure, the compositions of respective magnetic recording layers may be the same or different and if desired, an intermediate layer may be interposed between magnetic recording layers to improve the magnetic recording properties.

Typically, the magnetic recording layer may be constructed by, in the case of a single layer structure, a five-element-based alloy mainly comprising cobalt and containing:

Chrome 14 to 23 at %, and

Platinum 1 to 20 at %, =ps by further combining therewith tungsten and carbon. In the case of a magnetic recording layer having a two-layer structure, the upper magnetic recording layer can have the above-described construction.

To speak more specifically, the five-element-based alloy for the magnetic recording layer having a single layer structure or for the upper magnetic recording layer in the two-layer structure can have a composition range represented by the following formula:

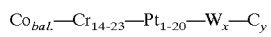

wherein bal. means a balance and x+y is from 1 to 7 at %.

In the magnetic recording medium of the present invention, by constructing the magnetic recording layer by a CoCrPt alloy and furthermore, optimizing the layer structure and the film-forming process, the noise can be greatly reduced and thereby, a high S/N ratio can be obtained and, as a result, a high-density recording medium can be obtained. This operation effect is attributable to the fact that W and C added to the CoCrPt alloy for forming the magnetic recording layer can form stable compounds of WC and $W_2C$ and these compounds have a very low solid solubility limit in Co and precipitate at the grain boundary.

In the case of the magnetic recording layer of the magnetic recording medium having a two-layer structure, the upper magnetic recording layer can employ the above-described magnetic recording layer comprising a CoCrPtWC five-element-based alloy. For the under magnetic recording layer disposed in the middle between the upper magnetic recording layer and the underlayer, a magnetic recording layer constructed by a five-element-based alloy mainly comprising cobalt and containing:

Chrome 13 to 21 at %, and

Platinum 1 to 20 at %, by further combining therewith tantalum and niobium may be used.

To speak more specifically, this five-element-based alloy of the lower magnetic recording layer can have a composition range represented by the following formula:

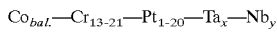

wherein bal. means a balance and x+y is from 1 to 7 at %. In this five-element-based alloy for the lower magnetic recording layer, the amounts of tantalum and niobium added are preferably equal or nearly equal and the total amount is preferably from 1 to 7 at %.

In the magnetic recording medium of the present invention, irrespective of a single layer structure or a two-layer structure, the magnetic recording layer preferably has a tBr (a product of the thickness t of magnetic recording layer and the remnant magnetization density Br) of 30 to 180 G$\mu$m. In particular, the magnetic recording layer having a single layer structure preferably has a tBr of 50 to 180 G$\mu$m and the magnetic recording layer having a two-layer structure preferably has a tBr of 30 to 160 G$\mu$m. Thus, the magnetic recording layer is constructed to have a low Br as compared with conventional magnetic recording layers and therefore, is optimal for use in the magneto-resistance effect type heads including MR head.

The magnetic recording layer provided through an underlayer on a glass substrate which is rendered porous of the present invention can be formed preferably by a sputtering method under predetermined film-forming conditions. In order to increase the coercivity, the sputtering is preferably performed while applying a DC negative bias. Also, the sputtering is preferably performed using, for example, magnetron sputtering, similarly to the above-described film formation of underlayer. For example, suitable film-forming conditions are such that the film-forming temperature is from about 100 to 300° C., the Ar gas pressure is from about 1 to 10 mTorr, and the DC negative bias is from about 80 to 400 V. If desired, other film-forming method such as vapor deposition or ion beam sputtering may be used in place of the sputtering.

The magnetic recording medium of the present invention comprises a carbon protective layer on the magnetic recording layer for protecting the magnetic recording layer. The carbon protective film can be fundamentally a carbonaceous protective layer commonly used in the field of magnetic recording medium. Suitable examples of the carbon protective layer include a C layer, a WC layer, an SiC layer, a $B_4C$ and a hydrogen-containing C layer. The carbon protective layer may be formed by a sputtering method or a CVD method which have been heretofore widely used, or may be formed by a filtered cathodic arc method (hereinafter referred to as an "FCA method") which is a technique developed in recent years. According to the FCA method, a carbon protective layer having high hardness accumulates on the magnetic recording layer and at the same time, when nitrogen is incorporated into the carbon protective layer having high harness, the carbon protective layer is greatly improved in the adsorptivity to a liquid lubricant, whereby excellent durability can be obtained and maintained.

The magnetic recording medium of the present invention may have additional layers commonly used in this technical field in addition to those essential layers and layers which can be arbitrarily used, or the layers of the magnetic recording medium may be subjected to any chemical treatment. For example, a fluorocarbon resin-based lubricant layer may be formed or on the carbon protective layer or a treatment for the same purpose may be applied. Suitable examples of the lubricant include those easily available under the trade names of Fomblin and Criotox. Such a lubricant has a function of preventing a problem called a head crash destroying the magnetic recording data due to contact between the head and the medium and prolonging the life of the medium. The thickness of the lubricant layer is usually from about 0.1 to 0.5 nm.

The magnetic recording medium of the present invention can be manufactured by various methods within the scope of the present invention, however, as described above, the magnetic recording medium is preferably manufactured by producing a nonmagnetic glass substrate comprising a borosilicate glass containing silica as a main component and having on the surface thereof a continuous texture derived from the porous structure according to the method of the present invention, and providing at least one magnetic recording layer comprising a magnetic metal material on the glass substrate.

Figure 4:
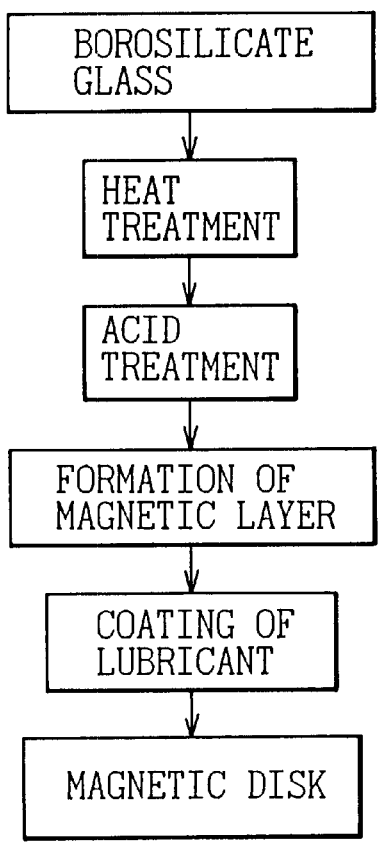
FIG. 4 is a flow sheet explaining the production process of the magnetic recording medium of the present invention.

FIG. 4 is a flow sheet showing the production process of the magnetic recording medium of the present invention in order. According to the present invention, a borosilicate glass is heat-treated and acid-treated to manufacture the medium substrate of the present invention, a magnetic recording layer (magnetic layer) and the like are formed on the surface of the substrate, using techniques commonly known in the field of production of magnetic recording mediums, and a lubricant is coated on the carbon protective layer as the outermost layer, whereby the objective magnetic disk can be produced. The formation of magnetic recording layer, carbon protective layer and the like and the coating of lubricant may be freely changed, if desired, however, these are advantageously accomplished under the above-described production conditions.

In addition to the magnetic recording medium and the production method therefor, the present invention also provides a magnetic disk device for magnetic recording. In the magnetic disk device of the present invention, the structure thereof is not particularly limited, however, the magnetic disk device includes devices fundamentally comprising a recording head part for recording information in the magnetic recording medium and a reproducing head part for reproducing the information. In particular, the reproducing head part preferably comprises a magneto-resistance effect type head using a magneto-resistive element capable of causing change in the electric resistance according to the intensity of the magnetic field, namely, an MR head.

The magnetic disk device of the present invention preferably uses a composite magnetic head obtained by stacking a magneto-resistance effect element, an electric conductor layer for supplying a sense current to the magneto-resistance effect element, a magneto-resistance effect type reproducing head part for reading the information from the magnetic recording medium, a pair of magnetic poles each formed of a thin film, and an induction type recording head part for recording the information in the magnetic recording medium. The magneto-resistance effect type reproducing head may have various structures known in this technical field. Preferred examples thereof include AMR head using an anisotropic magneto-resistance effect and GMR head (including spin valve GMR head and the like) using a giant magneto-resistance effect. The electric conductor layer of the reproducing head part may have various constructions but preferred examples thereof include:

1. an electric conductor layer formed such that the thickness is relatively small in the vicinity of the magneto-resistance effect element and large in other portions, and
2. an electric conductor layer formed such that the thickness is relatively small and the width is small in the vicinity of the magneto-resistance effect element, and the thickness and width are large in other portions. For adjusting the electric conductor layer to have such a thickness and if desired, such a width, various methods may be used but this is preferably attained by forming the electric conductor layer to have a multi-layer structure and thereby increasing the thickness.

When a magnetic disk device having the above-described construction is particularly used, the magnetic pole in the recording head part can be reduced at the curve, the resistance of the electric conductor layer can be decreased and if the off-track error is small, the information can be read out precisely with high sensitivity.

Figure 5:
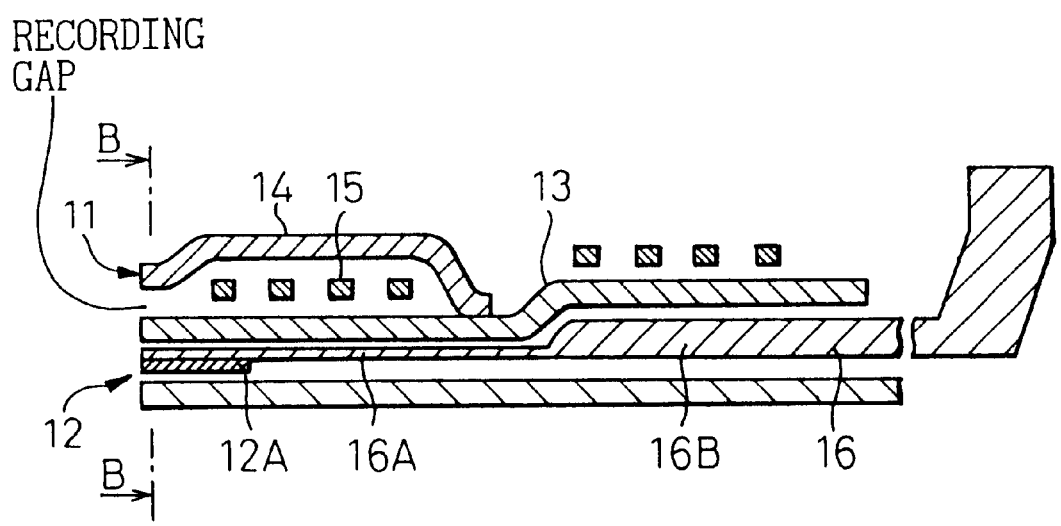
FIG. 5 is a cross-sectional view showing the principle of the magnetic disk device of the present invention.
Figure 6:
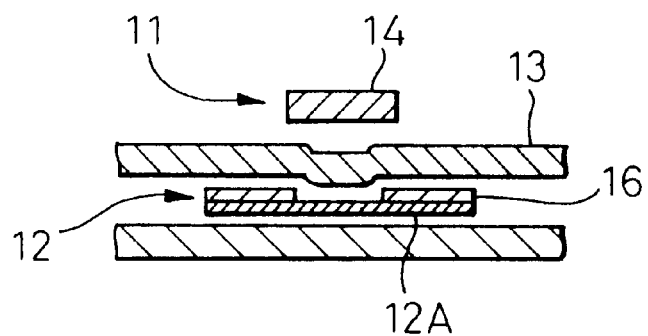
FIG. 6 is a cross-sectional view along the line segment B—B of the magnetic disk device of FIG. 5.

In the magnetic disk device of the present invention, for example, the recording head part and the reproducing head part each may have a stacked structure shown in FIGS. 5 and 6. FIG. 5 is a principle view showing the magnetic disk device of the present invention and FIG. 6 is a cross-sectional view along the line segment B—B of FIG. 5.

In FIGS. 5 and 6, the reference number 11 is an induction type recording head part for recording information in the magnetic recording medium and the reference number 12 is a magneto-resistance effect type reproducing head part for reading the information. The recording head part 11 is constructed by a lower magnetic pole (upper shield layer) comprising NeFe or the like, an upper magnetic pole 14 comprising NiFe or the like, which faces the lower magnetic pose 13 at a constant distance, and a coil 15 for exciting the magnetic poles 13 and 14 and thereby attaining recording of information in the magnetic recording medium.

The reproducing head part 12 is preferably constructed as an AMR head, a GMR head or the like and on the magneto-resistance effect element part 12A thereof, a pair of electric conductor layers 16 for supplying a sense current to the magneto-resistance effect element part 12A is provided at a distance corresponding to the recording track width. Here, the electric conductor layer 16 is formed to have a small thickness in the vicinity 16A of the magneto-resistance effect element part 12A and a large thickness in other portions 16B.

In the construction shown in FIGS. 5 and 6, the thickness of the electric conductor layer 16 is reduced in the vicinity 16A of the magneto-resistance effect element part 12A, therefore, the lower magnetic pole (upper shield layer) 13 and the like are decreased in the curve. By virtue of this construction, the recording gap facing the magnetic recording medium is not curved so much and, as a result, even if the position of the magnetic head on the track at the recording of information slightly slips from the position of the magnetic head on the track while reading, the magnetic disk device can correctly read the information and, despite the small off-track error, occurrence of errors in reading can be avoided.

On the other hand, the electric conductor layer 16 is formed to have a large thickness in the portion 16B exclusive of the vicinity of the magneto-resistance effect element part 12A, therefore, the entire resistance of the electric conductor layer 16 can be reduced and, as a result, the change in resistance of the magneto-resistance element part 12A can be detected with high sensitivity, the S/N ratio is improved, the electric conductor layer 16 can be freed from the generation of heat, and noise ascribable to heat generation can be prevented from occurring.

Figure 7:
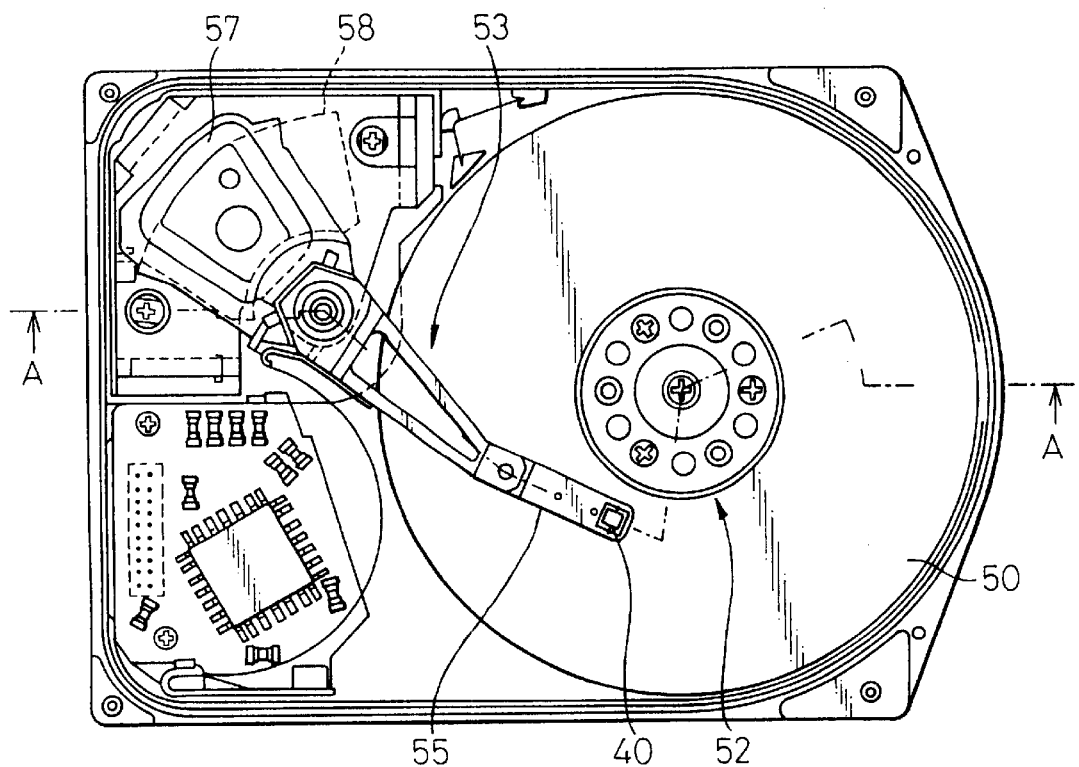
FIG. 7 is a plane view showing one example of the magnetic disk device of the present invention.
Figure 8:
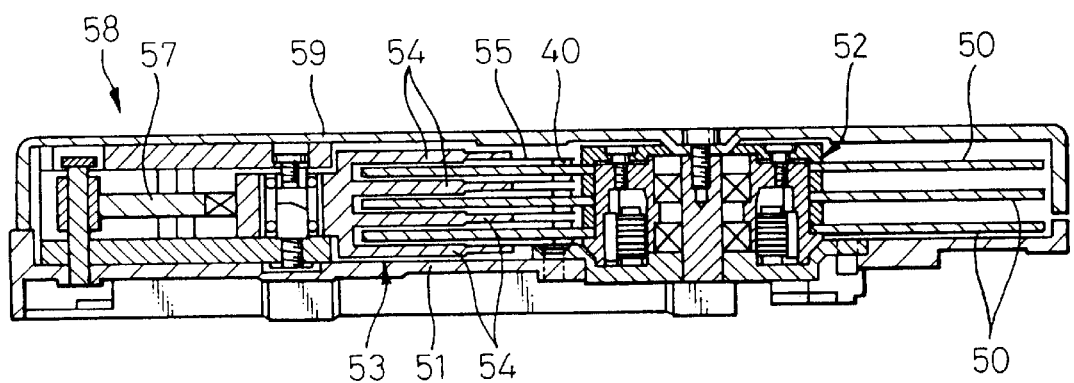
FIG. 8 is a cross-sectional view along the line segment A—A of the magnetic disk device of FIG. 7.

FIGS. 7 and 8 show one example of the magnetic disk device according to the present invention. FIG. 7 is a plan view (showing the state where the cover is removed) of the magnetic disk device and FIG. 8 is a cross-sectional view along the line segment A=13 A of FIG. 7.

In these Figures, the reference number 50 is a plurality of magnetic disks (in the example shown, 3 disks) as a magnetic recording medium which is rotated by a spindle motor 52 provided on the base plate 51. The magnetic disk 50 uses a textured borosilicate glass-made substrate according to the present invention.

The reference number 53 is an actuator rotatably provided on the base plate 51. At one end of this actuator 53, a plurality of head arms 54 extending in the recording surface direction of the magnetic disk 50 are formed. At the end of this head arm 54, a spring arm 55 is fixed and to the flexure part of this spring arm 55, a slider 40 is tiltably fixed through an insulating film not shown. At the other end of the actuator 53, a coil 57 is provided.

On the base plate 51, a magnetic circuit 58 constructed of a magnet and a yoke is provided and within the magnetic gap of this magnetic circuit 58, the coil 57 is disposed. The magnetic 58 and the coil 57 constitute the moving coil-type linear motor (voice coil motor; VCM). The upper portion of the base plate 51 is covered by a cover 59.

The operation of the magnetic disk device having the above-described construction is described below. When the magnetic disk 50 is stopped, the slider 40 is stopped while contacting with the refuge zone of the magnetic disk 50.

When the magnetic disk 50 is rotation-driven at a high speed by a spindle motor 52, the slider flies above the disk surface at a small distance due to the air stream generated by the rotation of the magnetic disk 50. In this state, when a current is passed to the coil 57, a thrust is generated in the coil 57 and the actuator 53 rotates, whereby the head (slider 40) can be moved to the desired track of the magnetic disk to perform the reading or writing of data.

In this magnetic disk device, the electric conductor layer used for the magnetic head is formed to have a small thickness in the vicinity of the magneto-resistance effect element part and a large thickness in other portions, so that the magnetic pole of the recording head part can be reduced at the curve, the resistance of the electric conductor layer can be decreased and if the off-track error is small, the information can be read out correctly with high sensitivity.

Examples:

The present invention is described below by referring to the Examples. The present invention should not be construed as being limited by the Examples set forth below.

EXAMPLE 1

In a crucible, 200 g in total of powdered glass raw materials (10% by weight of $Na_2O$, 30% by weight of $B_2O_3$ and 60% by weight of $SiO_2$) were charged and mixed. The resulting mixture was then molten in an electric furnace at 1,600° C. and after the glass raw materials were thoroughly molten, a stirring blade was inserted into the obtained glass molten solution and the solution was stirred for about 1 hour. The stirring blade was taken out from the crucible and the solution was left standing for 30 minutes. The molten solution after standing was poured into a molding jig and hardened. As a result, a block of sodium borosilicate glass was obtained. The obtained glass block was again heated to a temperature near the glass transition temperature of the glass and then gradually cooled to eliminate distortion. After the removal of distortion, the glass block had a size of 10 cm in length, 10 cm in width and 1 cm in height.

The obtained glass block was sliced into a donut disk-like shape having a thickness of about 1.5 mm and then cut into a glass disk having concentric inner and outer circumferences. The inner and outer circumferences of the glass disk were chamfered using a diamond jig. Thereafter, the upper and lower surfaces of the glass disk both were coarsely lapped and polished.

Subsequently, the glass disk after the polishing was placed in a heating furnace and heated at a temperature of 600° C. for 15 hours. Upon heating, phase separation of the glass took place and island regions of $Na_2O$—$B_2O_3$ were formed, as a worm-eaten state, in the sea region comprising $SiO_2$.

After the phase separation treatment, the glass disk was acid-treated by dipping it in an aqueous 5 vol % nitric acid solution (70° C.) for 1 hour. As a result of the acid treatment, $Na_2O$—$B_2O_3$ in the phase separated glass was gradually dissolved out into the aqueous nitric acid solution and pores corresponding to islands of $Na_2O$—$B_2O_3$ were formed. The obtained pores of the porous glass had an average pore size of about 200 nm. This glass disk was analyzed by an atomic absorption method and confirmed to comprise $SiO_2$ glass having a purity of 99%.

Subsequently, the heat treatment (phase separation treatment) was performed at the same heat-treatment temperature (650° C.) by varying the treatment time so as to verify that the texture state on the surface of the finally obtained porous glass can be freely controlled by controlling the heat-treatment temperature and time. The phase separation did not proceed much after a heat treatment for 3 hours, however, as shown below, the pore size of pores of the porous glass was increased as the heat-treatment time was prolonged.

Pore size of pores after heat-treatment about 30 nm for 6 hours

Pore size of pores after heat-treatment about 80 nm for 10 hours

Pore size of pores after heat-treatment about 200 nm for 15 hours

Pore size of pores after heat-treatment about 250 nm for 25 hours

The change in the pore size of pores with the passing of time was evaluated in view of the object of the present invention, as a result, it was understood that at the heat-treatment temperature of 650° C., a heat-treatment time of about 10 to 15 hours is usually useful.

EXAMPLE 2

The procedure described in Example 1 was repeated except that the powdered glass raw materials (10% by weight of $Na_2O$, 30% by weight of $B_2O_3$ and 60% by weight of $SiO_s$) were replaced by similarly powdered glass materials (10% by weight of $Li_2O$, 30% by weight of $B_2O_3$ and 60% by weight of $SiO_2$) in this Example. As a result, an $SiO_2$ glass having on the surface thereof a continuous texture derived from the porous structure was obtained similarly to Example 1.

EXAMPLE 3

A magnetic disk having the following layer structure was manufactured.

---

Lubricant Layer
Nitrogen-Doped Carbon Protective Film
Magnetic Recording Layer (CoCrPtTaNb)
Under layer ($CrMo_{10}$)
Borosilicate Glass Substrate Having
Textured Surface

---

The surface of the sodium borosilicate glass substrate manufactured in Example 1 was thoroughly washed and thereon, a CrMo10 (at %) underlayer having a thickness of 30 nm, a CoCrPtTaNb-based magnetic recording layer having a thickness of 27 nm, a nitrogen-doped carbon (C) protective film and a lubricant layer comprising "Fomblin AM3001" (trade name) having a thickness of 1 nm were sequentially deposited using a DC magnetron sputtering apparatus. In this Example, before the formation of underlayer, the sputtering chamber was evacuated to $3\times10^{-7}$ Torr or less, the substrate temperature was elevated to 280° C., the sputtering chamber was kept at 5 mTorr by introducing an Ar gas and, while applying a bias voltage of -200 V, CrMo as the underlayer was formed. After the formation of underlayer, the CoCrPtTaNb film was formed to have a Brt of 100 G$\mu$m (thickness of 27 nm). The target used for the film formation was a composite target obtained by disposing Pt, Ta and Nb chips to a CoCr target.

EXAMPLE 4

The surface of the sodium borosilicate glass substrate manufactured in Example 1 was thoroughly washed and thereon, a Cr underlayer having a thickness of 120 nm, a CoNiCr-based magnetic recording layer having a thickness of 56 nm, and a diamond-like carbon (DLC) protective film were sequentially formed using a DC magnetron sputtering apparatus. Subsequently, on the DLC protective layer, "Fomblin AM3001" (trade name) was coated to a thickness of 1 nm and impregnated. The surface roughness (Ra) on the surface of the thus-manufactured magnetic disk was measured by an interatomic force microscope (AFM) and found to be about 0.5 nm.

Then, the magnetic disk obtained was mounted on a commercially available friction tester (manufactured by Fujitsu Automation K. K.), and a stiction test was performed using a microslider having a head load of 3 g. As a result, when CSS was repeated 30,000 times, the coefficient of static friction was 0.5 and the coefficient of dynamic friction was 0.2, revealing that the frictional sliding properties were remarkably good.

For the purpose of comparison, a magnetic disk was manufactured in the same manner as above using a sodium borosilicate glass substrate manufactured by omitting the heat treatment for causing phase separation and the acid-treatment subsequent thereto in Example 1 (comparative disk having no texture). This disk was, however, lacking in anisotropy derived from the texture on the surface, therefore, could not be used by mounting it on a magnetic disk device.

As described in the foregoing pages, when the medium substrate of the present invention is used, a magnetic disk excellent in the frictional sliding properties against the magnetic head and in turn in the low floating properties can be provided.

In the production of the medium substrate, the uneven structure formed on the substrate surface can be easily adjusted by controlling the phase separation temperature, namely, the heat-treatment temperature, and accordingly, the texture can be designed with high efficiency.

Since the borosilicate glass can be changed into $SiO_2$ glass having a purity of 99% or more by the phase separation treatment and subsequent heat-treatment, a magnetic recording medium having high water resistance and excellent weather resistance can be provided.

Furthermore, according to the present invention, a high-performance magnetic disk device can be provided by integrating the above-described excellent magnetic recording medium.

What is claimed is:

1. A medium substrate for use as a substrate in magnetic recording mediums and the like, said medium substrate comprising silica ($SiO_2$) glass having a purity of 99% or more as a main component, the silica glass being a sea component of phase-separated borosilicate glass having an islands-in-sea structure, and having on the surface thereof a continuous texture derived from the porous structure of the silica glass, the texture having a surface roughness Ra of 1 to 10 nm and a pore size of 5 to 250 nm.

2. The medium substrate as recited in claim 1, wherein the borosilicate glass is sodium borosilicate glass formed starting from $Na_2O$, $B_2O_3$ and $SiO_2$.

3. The medium substrate as recited in claim 2, wherein the sodium borosilicate glass has the following composition:
   $Na_2O$ 10 to 30% by weight,
   $B_2O_3$ 10 to 30% by weight, and
   $SiO_2$ 50 to 80% by weight.

4. The medium substrate as recited in claim 3, wherein the sodium borosilicate glass comprises 10% by weight of $Na_2O$, 30% by weight of $B_2O_3$ and 60% by weight of $SiO_2$.

5. The medium substrate as recited in claim 1, wherein the borosilicate glass is lithium borosilicate glass formed starting from $Li_2O$, $B_2O_3$ and $SiO_2$.

6. The medium substrate as recited in claim 5, wherein the lithium borosilicate glass has the following composition:
   $Li_2O$ 5 to 30% by weight,
   $B_2O_3$ 10 to 30% by weight, and
   $SiO_2$ 50 to 80% by weight.

7. The medium substrate as recited in claim 6, wherein the lithium borosilicate glass comprises 5% by weight of $Li_2O$, 30% by weight of $B_2O_3$ and 65% by weight of $SiO_2$.

8. The medium substrate as recited in claim 1, wherein the porous structure of the borosilicate glass is formed by way of phase separation during a heat treatment of the glass and elution of components during an acid treatment subsequent to the phase separation.

9. The medium substrate as recited in claim 1, wherein the continuous texture is selectively formed on the surface of the substrate.

10. A method for producing a medium substrate for use as a substrate in magnetic recording mediums and the like, said medium substrate comprising silica ($SiO_2$) glass having a purity of 99% or more as a main component, the silica glass being a sea component of phase-separated borosilicate glass having an islands-in-sea structure, and having on the surface thereof a continuous texture derived from the porous structure of the silica glass, the texture having a surface roughness Ra of 1 to 10 nm and a pore size of 5 to 250 nm, the method comprising the steps of:

heat-treating a disk of borosilicate glass at a temperature of 500 to 750° C. to cause phase separation, thereby forming the phase-separated borosilicate glass; and treating the phase-separated borosilicate glass with an acid selected from the group consisting of nitric acid, sulfuric acid, hydrochloric acid and acetic acid to dissolve out an islands component from the phase-separated borosilicate glass and thereby render the borosilicate glass porous.

11. A method for producing a medium substrate as recited in claim 10, wherein the borosilicate glass is sodium borosilicate glass formed starting from $Na_2O$, $B_2O_3$ and $SiO_2$.

12. The method for producing a medium substrate as recited in claim 11, wherein the sodium borosilicate glass has the following composition:

$Na_2O$ 10 to 30% by weight, $B_2O_3$ 10 to 30% by weight, and $SiO_2$ 50 to 80% by weight.

13. A method for producing a medium substrate as recited in claim 12, wherein the sodium borosilicate glass comprises 10% by weight of $Na_2O$, 30% by weight of $B_2O_3$ and 60% by weight of $SiO_2$.

14. The method for producing a medium substrate as recited in claim 10, wherein the borosilicate glass is lithium borosilicate glass formed starting from $Li_2O$, $B_2O_3$ and $SiO_2$.

15. The method for producing a medium substrate as recited in claim 14, wherein the lithium borosilicate glass has the following composition:

$Li_2O$ 5 to 30% by weight, $B_2O_3$ 10 to 30% by weight, and $SiO_2$ 50 to 80% by weight.

16. The method for producing a medium substrate as recited in claim 15, wherein the lithium borosilicate glass comprises 5% by weight of $Li_2O$, 30% by weight of $B_2O_3$ and 65% by weight of $SiO_2$.

17. The method for producing a medium substrate as recited in claim 10, wherein the borosilicate glass is heat-treated at a temperature of 600 to 700° C. for 5 to 24 hours to control the pore size of the porous structure to the range from 5 to 250 nm.

18. The method for producing a medium substrate as recited in claim 10, wherein after the borosilicate is heat-treated to cause phase separation, the acid treatment is performed while allowing a masking element to be present in the region exclusive of the landing zone of a magnetic head to selectively render the landing zone porous.

19. A magnetic recording medium comprising a substrate having applied thereon at least a magnetic recording layer, said substrate comprising silica ($SiO_2$) glass having a purity of 99% or more as a main component, the silica glass being a sea component of phase-separated borosilicate glass having an islands-in-sea structure, and having on the surface thereof a continuous texture derived from the porous structure of the silica glass, the texture having a surface roughness Ra of 1 to 10 nm and a pore size of 5 to 250 nm.

20. The magnetic recording medium as recited in claim 19, wherein the borosilicate glass comprises sodium borosilicate glass formed starting from $Na_2O$, $B_2O_3$ and $SiC_2$ or lithium borosilicate glass formed starting from $Li_2O$, $B_2O_3$ and $SiO_2$.

21. A method for producing a magnetic recording medium comprising a substrate having applied thereon at least a magnetic recording layer, in which said substrate comprises silica ($SiO_2$) glass having a purity of 99% or more as a main component, the silica glass being a sea component of phase-separated borosilicate glass having an islands-in-sea structure, and having on the surface thereof a continuous texture derived from the porous structure of the silica glass, the texture having a surface roughness Ra of 1 to 10 nm and a pore size of 5 to 250 nm, the method comprising the steps of:

heat treating a disk of borosilicate glass at a temperature of 500 to 750° C. to cause phase separation, thereby forming the phase-separated borosilicate glass; and treating the phase separated borosilicate glass with an acid selected from the group consisting of nitric acid, sulfuric acid, hydrochloric acid and acetic acid to dissolve out an islands component from the phase-separated borosilicate glass, thereby producing said substrate.

22. A magnetic disk device comprising a recording head part for recording information in a magnetic recording medium and a reproducing head part for reproducing the information, wherein the magnetic recording medium is a magnetic recording medium comprising a nonmagnetic substrate having provided thereon a magnetic recording layer and the substrate comprises silica ($SiO_2$) glass having a purity of 99% or more as a main component, the silica glass being a sea component of phase-separated borosilicate glass having an islands-in-sea structure, and having on the surface thereof a continuous texture derived from the porous structure of the silica glass, the texture having a surface roughness Ra of 1 to 10 nm and a pore size of 5 to 250 nm.

23. The magnetic disk device as recited in claim 22, wherein the borosilicate glass is sodium borosilicate glass or lithium borosilicate glass.

* * * * *